US012794719B1

(12) United States Patent
Leavy et al.

(10) Patent No.: US 12,794,719 B1

(45) Date of Patent: Nov. 10, 2026

(54) SOFTWARE AS A SERVICE COMPLIANCE

(71) Applicant: Amazon Technologies, Inc., Seattle, WA (US)

(72) Inventors: Thomas Michael Leavy, River Edge, NJ (US); Arvind Muthukrishnan, Woodinville, WA (US); Tanvi Jain, New York, NY (US); Paul Willbond Cushman, Montclair, NY (US); ShinYi Chen, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 615 days.

(21) Appl. No.: 17/994,232

(22) Filed: Nov. 25, 2022

(51) Int. Cl.
*H04L 9/32* (2006.01)
*H04L 9/08* (2006.01)

(52) U.S. Cl.
CPC .......... *H04L 9/3271* (2013.01); *H04L 9/0825* (2013.01); *H04L 9/3247* (2013.01)

(58) Field of Classification Search
CPC .... H04L 9/3271; H04L 9/3247; H04L 9/0825
See application file for complete search history.

(56) References Cited

U.S. PATENT DOCUMENTS

| | | | | |
|---|---|---|---|---|
| 10,412,191 | B1 | 9/2019 | Brandwine et al. | |
| 10,484,429 | B1 * | 11/2019 | Fawcett | H04L 63/20 |
| 10,541,814 | B2 * | 1/2020 | Leavy | H04L 9/3066 |
| 10,958,689 | B1 | 3/2021 | Ganesan et al. | |
| 11,194,764 | B1 | 12/2021 | Adhikari et al. | |
| 2009/0106557 | A1 | 4/2009 | Leonard | |
| 2011/0277019 | A1 * | 11/2011 | Pritchard, Jr. | H04L 63/0815 726/8 |
| 2017/0161505 | A1 | 6/2017 | Campagna et al. | |
| 2018/0183580 | A1 | 6/2018 | Scarlata et al. | |
| 2018/0332042 | A1 * | 11/2018 | Yu | H04L 67/02 |
| 2019/0294707 | A1 * | 9/2019 | Ramaswamy | G06Q 10/10 |
| 2021/0266309 | A1 | 8/2021 | Guccione et al. | |
| 2022/0206867 | A1 | 6/2022 | Parthasarathy et al. | |
| 2022/0303256 | A1 | 9/2022 | Sheth et al. | |
| 2023/0015819 | A1 | 1/2023 | Nickels et al. | |
| 2023/0155839 | A1 | 5/2023 | Kreder, III et al. | |

OTHER PUBLICATIONS

USPTO Notice of Allowance dated Oct. 7, 2024, U.S. Appl. No. 18/081,595, 9 pages.

* cited by examiner

*Primary Examiner* — Bassam A Noaman

(74) *Attorney, Agent, or Firm* — Davis Wright Tremaine LLP

(57) ABSTRACT

Techniques and system for a compliance service that enables users to retain information in accordance with a data policy. The system receives from a user device credentials that may be used to identify the compliance service and obtain a cryptographic key for signing messages sent over a secured communications session. The compliance service is deployed in an environment to observe messages sent within a network, and client devices within the network are notified that the compliance service has been activated.

21 Claims, 9 Drawing Sheets

SOFTWARE AS A SERVICE COMPLIANCE

BACKGROUND

Business customers rely on communications between employees and business partners to conduct work. As the workforce becomes more distributed, more conversations are happening digitally. As the many options for communication continue to develop, employees more and more are using tools that were designed for consumers, such as text messaging, to conduct business-related discussions. These tools, however, present the risk of cyber-attack and create new data security challenges for organizations. Furthermore, organizations in the public sector and highly-regulated industries (e.g., healthcare, banking, and financial services) need to comply with industry-specific data protection regulations, but existing techniques for ensuring compliance with regulatory and auditing policies can be labor intensive, prone to error, and inefficient.

BRIEF DESCRIPTION OF TIE DRAWINGS

Various techniques will be described with reference to the drawings, in which.

DETAILED DESCRIPTION

Figure 1:
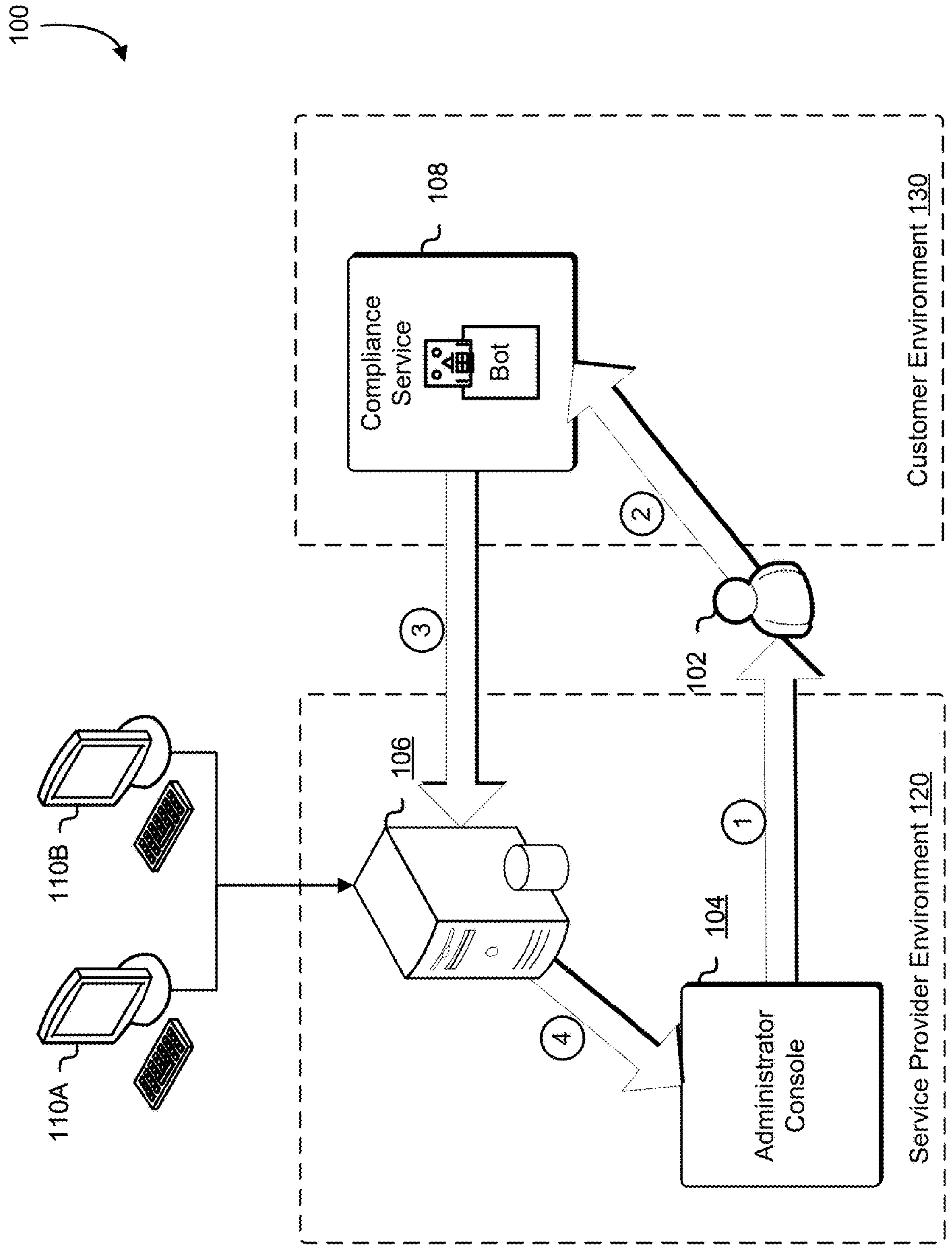
FIG. 1 illustrates an overview of deployment a compliance service in accordance with an embodiment.

Techniques and system described below relate to enabling customers to retain information to meet regulatory and auditory needs in an encrypted way in their own control storage. Techniques described herein enable that all sides of a conversation are recorded for regulatory and audit purposes and having a unique, asynchronous collaboration tool that meets all regulatory and compliance needs for every organization. Messages recorded in the conversation may be stored in a storage service of a computing system service provider or a default option to capture and save messages and files locally.

In one example, a system may receive an application programming interface request to activate a secure communications session, the secure communications session to be in compliance with a data retention policy. The system may include a computing resource service provider and customer environment, and deploy a compliance service that provides a compliance account associated with the compliance service. A compliance container image may include configuration information of the compliance service and interact with a back-end server to active the compliance account and generate a user signing key. The administrator console will sense a user signing key has been created and check a database table that indicates the signing key has been created for the compliance bot/service. The administrator console may then give the user the ability to activate compliance. The user will activate compliance on the administrator console which will then notify the messaging server that compliance has started. Upon receiving the user signing key, the administrator console may notify a messaging server that compliance has started, e.g., the organization's network is now being monitored for compliance with a policy by a compliance bot.

In one example, the back-end server facilitates messages between clients within the network, and once the compliance bot is made active, any messages the clients within that network send have to include the compliance bot in that message. If the compliance bot is not included in the message, that message will fail to send.

In another example, a user may start compliance in a network that is already active, and turn it off, restart it, etc. When an administrator console turns on compliance, the administrator console communicates with the back-end server and the back-end server sends out a configuration message to notify clients within the network that compliance has been activated. A new client device of a user may be started in a pending state until a compliance bot client or other existing client provisions the new client device. The new device may then use a challenge value to communicate with the server and set up cryptographic keys for a secure communications session.

In yet another example, a user may deactivate compliance by interacting with the administrator console to turn off compliance. The administrator console may then signal a messaging server of the back-end server that compliance has been deactivated. The back-end server will then communicate with all the clients to indicate that compliance is turned off. In one example, when compliance is deactivated, the compliance bot may continue to run, and not receive messages while compliance is deactivated. The administrator does not have to interact with the compliance service to deactivate compliance. In this case, the user is responsible for stopping the compliance container. If the compliance bot were to lose connection or communications to the compliance bot were interrupted, while the compliance service is still activated, the messages will continue to queue up in the back-end server, and once the compliance bot regains connectivity or starts back up, it will download all the messages that are queued up for it. Therefore, users will not lose any messages.

Techniques described and suggested in the present disclosure improve the field of computing, specifically in the field of compliance with regulatory requirements when conducting conversations between users in an organizational network, by providing a compliance service that is encrypted to the organization network to listen and store messages. Moreover, techniques described and suggested in the present disclosure are necessarily rooted in computer technology in order to overcome problems specifically arising with communication using end-to-end encryption by providing tools to enable companies to store content for regulatory and auditory requirements, and tools for maintaining security of communication in transit.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an aspect and a development process of an environment 100 in which an embodiment may be practiced. As illustrated in FIG. 1, the environment 100 may include a client device of a user 102, an administrator console 104, a back-end server 106, a compliance software application 108 (e.g., a compliance bot, or compliance service), and client devices 110A-110B. Although the communications are illustrated to be directed to and from a person, it is understood that they are directed to and from a device under the control of a person.

In one embodiment, the environment 100 may include a service provider environment 120 corresponding to a computing resource service provider (also known as a service provider, computing system service provider, etc.) and a customer environment 130. In one example, the user 102 may start the compliance service in the customer environment 130.

In step (1), in response to an application programming interface request from the user 102, the administrator console 104 may interact with the user 102 to generate credentials to create and start the compliance service 108. In an example, the administration console displays initial login credentials to the user 102. The initial login credentials may include a compliance bot username and a challenge value that the user device will have to copy and use to start the compliance bot. In step (2), the user 102 may enter the compliance bot username and challenge value into a command line interface provided by a compliance service 108. The compliance service 108 may then provision the compliance bot and start a messaging component of the computing system service provider. In step (3), the compliance service 108 may interact with the back-end server 106 to facilitate a notification to the administrator console 104 of a user signing key, and, in step (4), an indication that the compliance service is active.

The user 102 may be one or more of individuals, computing systems, applications, services, resources, or other entities having been authorized to administrate the compliance service 108. The user 102 may have a unique name (e.g., username) within an account with a computing resource service provider and may present, or otherwise prove, the possession of security credentials, such as by inputting a password, access key, and/or digital signature, to gain access to computing resources of the account. The user 102 may be a customer of the computing resource service provider. The user may make, using a computing device, a request, using an application programming interface provided by a front-end service, to start a compliance service in accordance with a data retention policy. Further detail on this may be found in the description of FIG. 2 below.

The administrator console 104 generates the compliance bot credentials and waits until it receives a valid user signing key before it fully activates the compliance service. In one example, the administrator console 104 communicates with the back-end server 106 to indicate that the messaging component of the computing system service provider is being monitored by the compliance bot. In another example, the administrator console 104 will provide a user interface (such as a graphical use interface) that allows users to create/start a compliance service and pause/stop the compliance service. This user interface may allow the user 102 to enter information necessary to run a software-as-a service (SAAS) compliance service, such as a compliance bot username, a compliance bot password, a data repository name and necessary credentials, and encryption keys usable to encrypt data saved to a data storage system.

The user signing key (such as described in the operations of 324-332 of FIG. 3) that may be used to encrypt a data object (e.g., messages or files) between client devices of the computing resource service provider network is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the message is digitally signed using a private key of a public/private key pair corresponding to a client device of a user that encrypts and/or digitally signs the data object.

In one embodiment, the administrator console 104 provides an indication of compliance being active and causes the configuration information to be provided to all the client devices within that network (e.g., this is the compliance bot name, the key associated with it, and the public key associated with it). In one embodiment, the client devices may provide an indication to the user initiating compliance that the client devices comply (e.g., agree to communicate via the network under compliance) with the data retention type of network and with the messages being tracked by the compliance service.

The compliance service/bot 108 may comprise a messaging component and a provisioning component. The provisioning component of the compliance bot is created so that the compliance bot 108 may communicate with a core service of the back-end server(s) 106 to activate a client. In one example, the compliance bot 108 may be configured based on various types of encryption, including server-side or client-side encryption using encryption keys of a key management system. In an embodiment, the compliance bot username may be a hard coded value that comprises a string of characters:

e.g., IO_BOT_NAME='compliance_123456789_bot'. In an embodiment, the compliance service 108 may support retention of logs, metrics, events, and alarms.

The client device(s) 110A-110B, in some embodiments, is embodied as a physical device and may be able to send and/or receive requests, messages, or information over an appropriate network. Examples of such devices include personal computers, cellular telephones, handheld messaging devices, laptop computers, tablet computing devices, set-top boxes, personal data assistants, embedded computer systems, electronic book readers, and the like, such as the computing device 900 described in conjunction with FIG. 9. Components used for such a device can depend at least in part upon the type of network and/or environment in which the embodiment is implemented. Protocols and components for communicating via such a network are well known and will not be discussed in detail. Communication over such a network may be enabled by wired or wireless connections and combinations thereof.

The network used to transmit communications between the components in the system environment 100 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

The service provider environment 120 and the customer environment 130, in some embodiments, are software containers. In some examples, a "container instance" (also referred to as "software container instance") may refer to a computer system instance (virtual or non-virtual, such as a physical computer system running an operating system) that is configured to launch and run software containers. The service provider environment 120 and the customer environment 130 may be configured to run software containers in accordance with the configuration file provided by a user of the computing resource service provider.

In some embodiments, the services provided by a computing resource service provider include one or more interfaces that enable the customer to submit requests via, for example, appropriately configured application programming interface calls to the various services. In addition, each of the services may include one or more service interfaces that enable the services to access each other (e.g., to enable a virtual computer system of the virtual computer system service to store data in or retrieve data from an on-demand data storage service and/or access one or more block-level data storage devices provided by a block-lever data storage service). Each of the service interfaces may also provide secured and/or protected access to each other via encryption keys and/or other such secured and/or protected access methods, thereby enabling secure and/or protected access between them. Collections of services operating in concert as a distributed computer system may have a single front-end interface and/or multiple interfaces between the elements of the distributed computer system.

Figure 2:
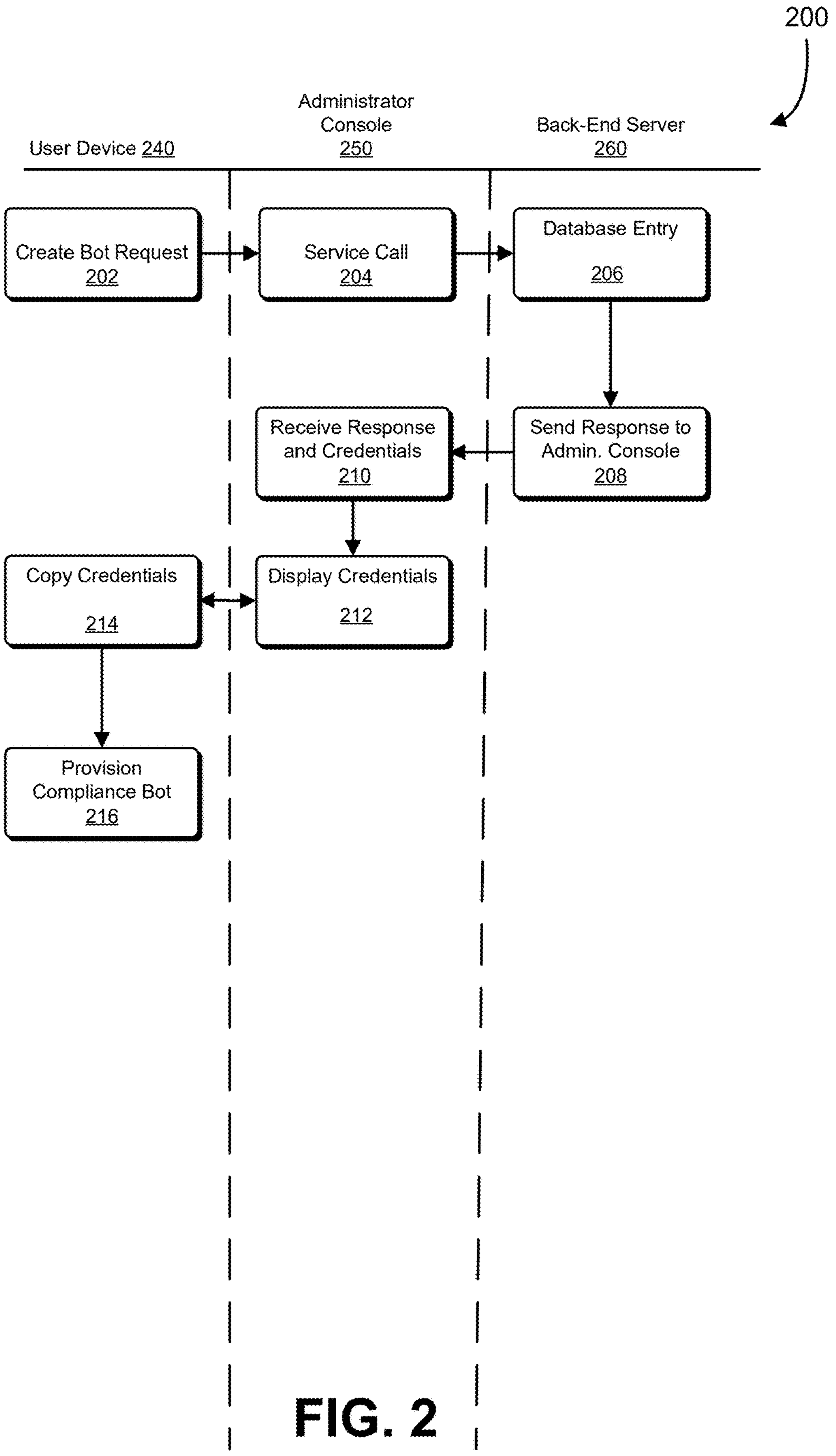
FIG. 2 is a swim diagram that illustrates an example of generating and saving credentials for starting a compliance service in accordance with an embodiment.

FIG. 2 is a swim diagram illustrating an example of a process 200 for generating and saving credentials for starting a compliance service in accordance with various embodiments. Some or all of the process 200 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 200 may be performed by any suitable system, such as a computing device 900 of FIG. 9. The process 200 includes a series of operations wherein a user device 240 requests to start a compliance service/bot to an administrator console, the administrator console 250 interacts with the user device 240 to generate and save the credentials to start the compliance service/bot.

The user device 240 may be similar to the user 102 in FIG. 1, the administrator console may be similar to the administrator console 104 in FIG. 1, and a back-end server 260 may be similar to the back-end server 106 in FIG. 1. In 202, the user device 240 communicates with the administrator console 250 to send an application programming interface request to launch the compliance bot in an instance of the user/customer as a running software application. In 204, the administrator console 250 makes a service call to a core service of the back-end server 260 to store a database entry 206 for the compliance bot 108, illustrated in FIG. 1.

In 208, the back-end server sends a response to the administrator console 250 indicating a successful database entry to correspond with the compliance bot, and that the status of the compliance bot 108 is set to inactive. The administrator console 250 will wait until it receives a valid user signing key before it proceeds to fully activate the compliance bot to active status. In 210, the administrator console 250 receives a response of the successful creation of the compliance bot and credentials associated with the compliance bot 108.

In 212, the administrator console 250 displays the credentials associated with the compliance bot, the credentials including a username of the compliance bot and a challenge value. In one embodiment, the administrator console 250 displays configuration information comprising a set of credentials (e.g., username, password, etc.) and challenge value associated with the compliance bot 108. The challenge value is a password that can be set using an environment value, a secret, or entered on the command line interface. When setting up the compliance bot 108 the first time, a new password will be generated. A unique key value will be generated unique to the instance of the compliance bot. In an embodiment, a re-install of the compliance bot will require the generated password, and the initial challenge value is not valid after the initial installation of the compliance bot.

In 214, the user device 240 may download a copy of configuration information including the credentials associated with the compliance bot 108 and use them to start the compliance bot 108. In one embodiment, the user device 240 may have the option of putting the challenge value in a secret using a secrets managing service. In one embodiment, a secret associated with a challenge value may be stored in the customer environment. The secret may contain the challenge value and any set of credentials needed to access the storage resource. In 216, the user device 240 may use the copy of credentials to provision the compliance bot.

Figure 3:
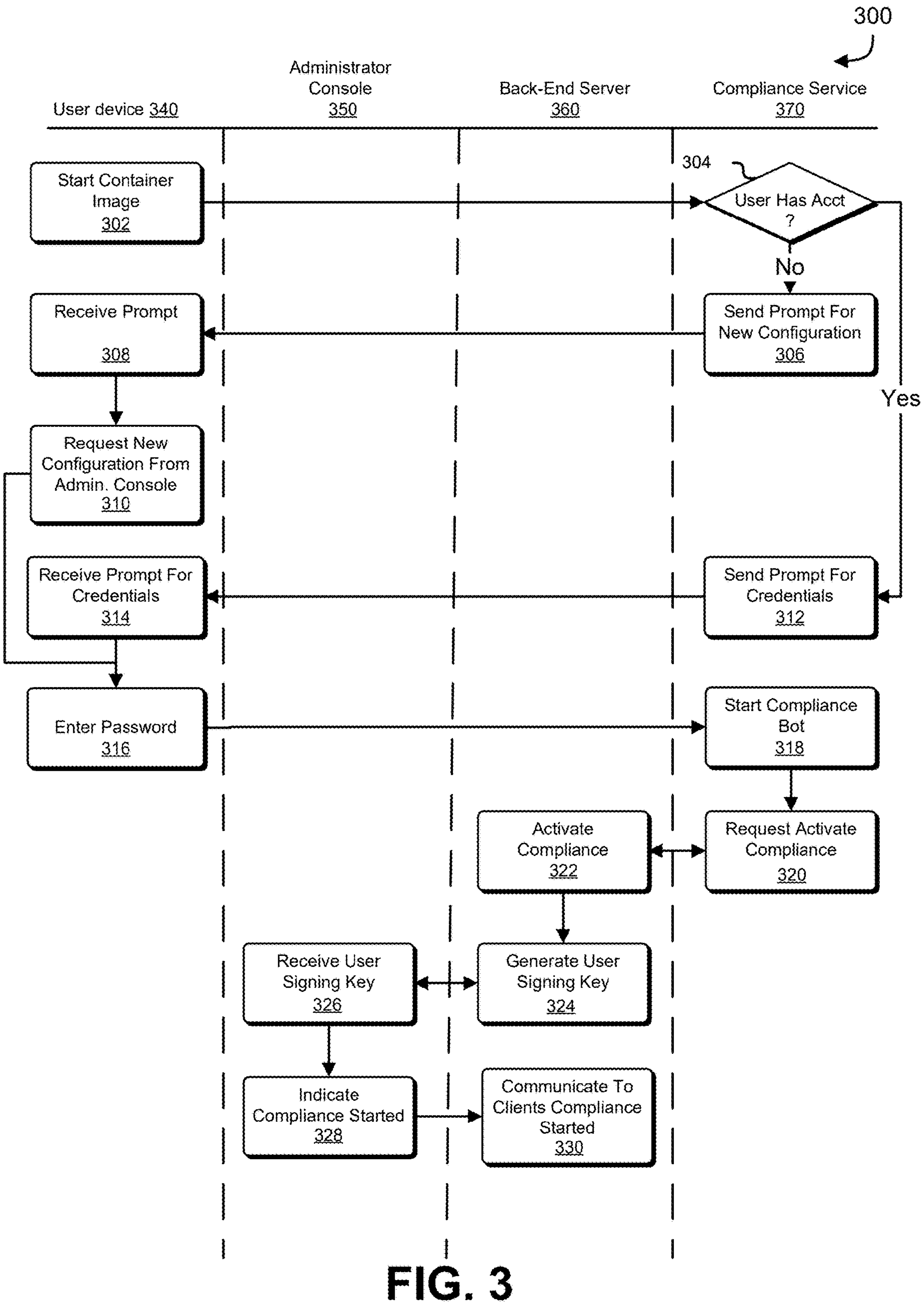
FIG. 3 is a swim diagram that illustrates an example of provisioning an account associated with a compliance service in accordance with an embodiment.

FIG. 3 is a swim diagram illustrating an example of a process 300 for provisioning an account associated with a compliance service in accordance with various embodiments. Some or all of the process 300 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 300 may be performed by any suitable system, such as a computing device 900 of FIG. 9. The process 300 includes a series of operations wherein a user device 340 starts a compliance service 370, the compliance service 370 provisions the compliance bot, as illustrated in FIG. 1, and interacts with a back-end server 360 to facilitate a notification to the user device 340 of a user signing key and the indication of the compliance service 370 being active.

In 302, the user device 340 may take credentials associated with the compliance bot 108 of FIG. 1 to start a compliance container image. The credentials may include a username of the compliance bot and a challenge value associated with the compliance bot. In 304, the compliance service 370 performs functionality to provision the account associated with the compliance service 370. In one embodiment, the compliance service 370 is a software container (such as a Docker container) that has the functionality to perform compliance provisioning and message handling work. In 306, if the user does not have an account (e.g., account is suspended), the compliance service 370 may send a prompt for a new configuration.

In 308, in response to receiving a prompt for a new configuration, the user device 340 may generate a new compliance account, and request that the administrator console generate a new configuration file 310. Configuration information to run the compliance service 370 may include a configuration file from the administrator console that includes the compliance bot credentials and an application programming interface (API) key used to return provisioning status back to the administrator console, user information that can be entered to determine how and where compliance messages and files are stored, and a secrets manager may be used when the compliance service 370 is executed in a computing resource service provider environment, other than in a customer environment.

In 312, the compliance service/compliance docker image may prompt the user device 340 for credentials including configuration information of any information necessary to store compliance data and to support metrics and alarms. In 314, the user device 340 receives the prompt for credentials from the compliance docker image.

In 316, the user device 340 may enter a password when prompted by the compliance bot. The challenge/password may be required when initially setting up the compliance bot instance. A unique key value may be generated internally which is unique to the instance of the compliance bot. When setting up the compliance bot the first time a new password will be generated. This generated password may become the password for the compliance bot 108.

In one embodiment, the compliance bot is configured using environment variables or using a secrets manager of computing resources service provider. The challenge/password of the compliance bot 108 may be set using an environment value, a computing resource service provider secret, or the challenge/password maybe entered in a command line interface.

In 318, compliance service 370 will start using a default file streaming default values defined in the environment variables. The environment variables may define compliance bot user credentials of the compliance service 370, the name of the secret to use, identification of bucket information, and received message handling configuration information. In one embodiment, environment variables for identifying compliance bot credentials may include the name of the compliance bot account, and a password/challenge value associated with the bot account. The bot password can also be stored in a secret managed in a service of a computing resource service provider.

In one embodiment, environment variables may be used to configure a default compliance streaming capability. The environment variables may be used to identify where to capture the messages and the files and configure the base name of the messages file and the size limit or time limit for the received messages files. These values may be configured using environment variables. In one embodiment, environment variables may be used to identify a computing resource service provider secret to use when using a secrets manager to store/retrieve credentials needed by the compliance service. In one embodiment, environment variables may be used to identify bucket information to enable the compliance service to stream messages and files to computing resource service provider. In one embodiment, to enable use of computing resource service provider buckets for captured messages/files with client-side encryption, a resource name value associated with a master key of a key management system (KMS) is defined. The compliance service may have access to the KMS to configure the compliance bot, such as with credentials and/or additional information about the compliance account and use for encrypting (and decrypting) the compliance bot with keys from a storage service. In one embodiment, the compliance container image starts the compliance bot 108 using environment variables and configure it to rotate the received messages files every 15 minutes.

In 320, the compliance container image may interact with the back-end server 360 to activate an associated compliance account 322. In 324, the back-end server 360 may generate a user signing key. The user signing key may be a public key. In some embodiments, a key management service issues a key (such as a public key of a public-private key pair) to the customer so that the customer can perform client-side encryption of messages, with the client devices of the present disclosure having access to a key for decryption (such as the private key of the public-private key pair). In one embodiment, once the compliance service is started, the back-end sever 360 indicates the successful start of the compliance service to the administrator console 350.

In 326, the administrator console 350 may receive from the back-end server 360 an indication that the compliance service/bot 370 has started and is in a ready/active state, and ready for compliance to be turned on within the network. The administrator console 350 then obtains the user signing key. In one embodiment, the administrator console 350 may receive the user signing key from a database associated with the back-end server 360. In 328, once the administrator console 350 receives the user signing key, it may indicate to the client device of the user device 340 and provide a visual display that the compliance bot 370 has started. The administrator console 350 may then notify a messaging server of the computing resources service provider that the compliance bot 370 has started. In 330, the back-end server 360 may communicate with clients within a network to indicate that compliance has started. In some embodiments, the client devices obtain a configuration message comprising information about the compliance bot 370 (e.g., what is a compliance bot, security protocols, etc.), when client devices, such as client device(s) 110A-110B, send a direct message or create a room (e.g., to use secure room messages), the compliance bot 370 is part of that conversation.

Figure 4:
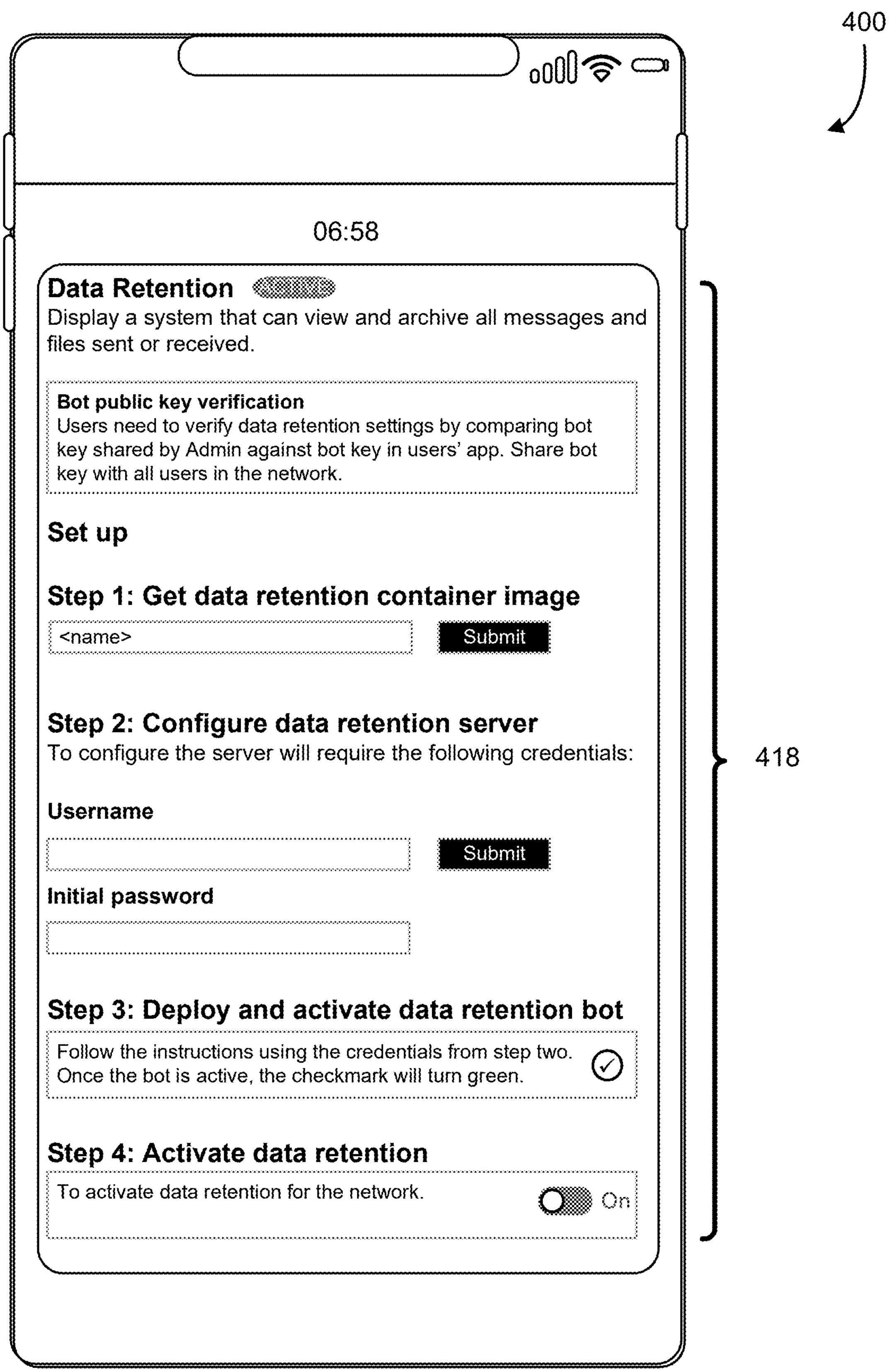
FIG. 4 illustrates an administrator user interface in accordance with an embodiment.

FIG. 4 illustrates an interface on a client device in accordance with an embodiment of the present disclosure. Specifically, FIG. 4 depicts an administrator console displayed in the interface 400 of a client device. The interface 400 may be a user interface that allows the user device to interact with the administrator console of FIG. 1. The interface 400 may include graphical elements such as text, graphical icons, audio, animations, and/or video to relay information to the user. Some of such graphical elements may be engaged with through the client device, such as by using a touch screen on the client device, by using voice commands audible to a microphone of the client device, and/or by using an input device (e.g., keyboard, mouse, etc.) communicatively coupled to the client device. The interface may be implemented on the client device in hardware and/or software. A web page is one example of an interface contemplated by the present disclosure. A graphical user interface of a computing application is another example of an interface contemplated by the present disclosure.

The client device may include an installation of a software application provided by a service provider 120 of FIG. 1 to the client device of the user 102 to enable compliance activation. The client device, by virtue of having the software application downloaded and installed, may interact with an interface of an administrator console, such as the administrator interface 418, which may be displayed in the interface 400 to prompt the user for login credentials for starting a compliance service in accordance with a data retention policy.

The administrator interface 418 may enable the user to activate compliance, for organizational and regulatory policies, and deploy a compliance bot 108, as illustrated in FIG. 1 to listen to all the conversations in the organization (e.g., XYZ Bank). The administrator interface 418 may include compliance bot configuration information, such as bot public key verification information, and prompts for the user to set up data retention of a user network. To set up data retention on the user network may include the following steps, as illustrated in FIG. 4: (1) get the data retention container image, (2) configure data retention server, (3) deploy and activate data retention compliance bot, and (4) activate data retention.

The data retention container image may be obtained from a publicly listed container hub. The user may pull the container image name from the container hub. To configure the data retention server, a user may require credentials, such as a compliance service username and an initial password, as illustrated in administrator interface 418. The user may deploy and activate the data retention compliance bot by following instructions using the credentials from step two. In one embodiment, once the compliance bot is active a checkmark in the interface turns green, as illustrated in administrator interface 418. Lastly, to activate data retention, the user may confirm that all the above steps have been completed and then toggle a switch to activate the data retention system, as illustrated in administrator interface 418. Thus, the user's interaction with the interface 400 may allow the user to deploy a system that can view and archive all messages and files, sent and/or received in compliance with a data retention policy.

Figure 5:
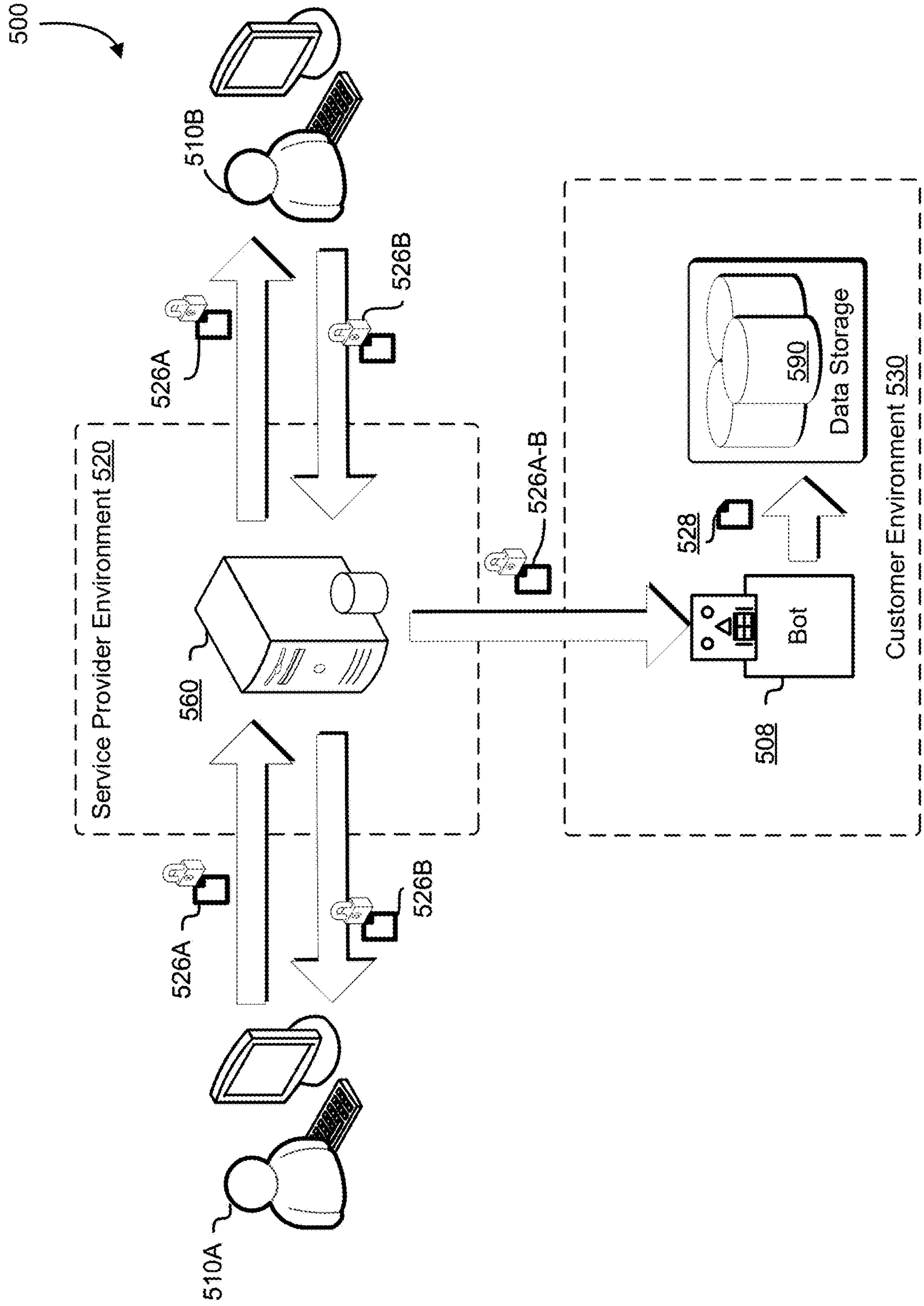
FIG. 5 illustrates an example of messaging between client devices of computing resource service provider in accordance with a compliance bot in accordance with an embodiment.

FIG. 5 illustrates an aspect of a system 500 of an embodiment of the present disclosure. FIG. 5 depicts a representation of messaging between client devices 510A-510B of a computing resource service provider in accordance with a compliance bot 508. The client devices 510A-510B may be similar to the client devices 110A-110B of FIG. 1. The compliance bot 508 may be similar to the compliance bot 108 of FIG. 1. The back-end server 560 may be similar to the back-end server 106 of FIG. 1. Although the communications are illustrated to be directed to and from a person, it is understood that they are directed to and from a device under the control of a person.

In some embodiments, the client devices 510A-510B send and/or receive requests, messages, or information over a network, implemented by a computing resource service provider in the service provider in service provider environment 520, and connected with the back-end server 560. The client devices 510A-510B communicate via a secured and/or protected session to send encrypted messages 526A-B, e.g., communications are encrypted in transit. The compliance bot 508 is also encrypted to the network. A switchboard connected to the back-end server 560 may look up client devices based on a username hash and send messages if the compliance bot 508 is included as a recipient. If the compliance bot 508 is not included, the switchboard will block the send. For example, if a client device of a user is communicating via an organization's network (e.g., XYZBank.com), a compliance bot will "listen" to every single conversation/communication between client devices of users within the organizational network.

In one embodiment, the compliance bot 508 streams information, such as a message 528, over a network of a local customer environment 530, to a data storage resource 590. The data storage 590 may be a comprised of one or more repositories configured to store messages and files and/or directories and metadata for the files and/or directories. The repositories may be individual databases or may be stored in one or more data stores of a data storage service of the computing resource service provider. Each repository may have various associated roles and policies specifying access types and restricting access to the repository to entities authorized by the customer to access the repository.

In one embodiment, the compliance bot 508 may use client-side encryption and set up encryption keys within a key management system (KMS). Messages and files received by the compliance bot will be encrypted using a KMS key, then put in a "bot-compliance" bucket. The compliance bot 508 may use the encryption keys to encrypt and store a message or file in the repositories. In one embodiment, the compliance bot 508 may store a message in chunks of data as opposed to each message that is received. Therefore, a data file comprising chunks of messages in it will be fully encrypted.

In one embodiment, the compliance bot 508 may use server-side encryption and will allow the repositories to be encrypted or unencrypted.

The compliance bot 508 has numerous options to configure how messages will be stored and where they will be stored. In one embodiment, the compliance bot may store captured messages and files using a storage system of a computing resource service provider. In another embodiment, the compliance bot 508 may, use a default option, and store the captured messages and files locally, e.g., as illustrated by data storage 590. The storage options may include the following:

- Store captured messages and files locally. Users of the compliance service may move these files to another system for long term storage and to make sure the host disk drive does not run out of space.
- Store captured messages and files on a storage system of a computing resources service provider bucket. The compliance bot 508 will save all decrypted messages and files to the storage system of a computing resources service provider bucket defined by the user. Once stored successfully the messages and file may be removed from the host machine.
- Store all captured messages and files encrypted on a storage system of a computing resources service provider bucket. The compliance bot will re-encrypt all captured messages and files using a key that the user supplies and save the messages and files to the storage system of a computing resource service provider bucket defined by the user. Once re-encrypted and stored successfully the messages and files may be removed from the host machine.

In one embodiment, messages are saved in files which are limited to a specific configurable size or time limit. These files are saved locally or on the defined storage system of a computing resource service provider bucket.

Figure 6:
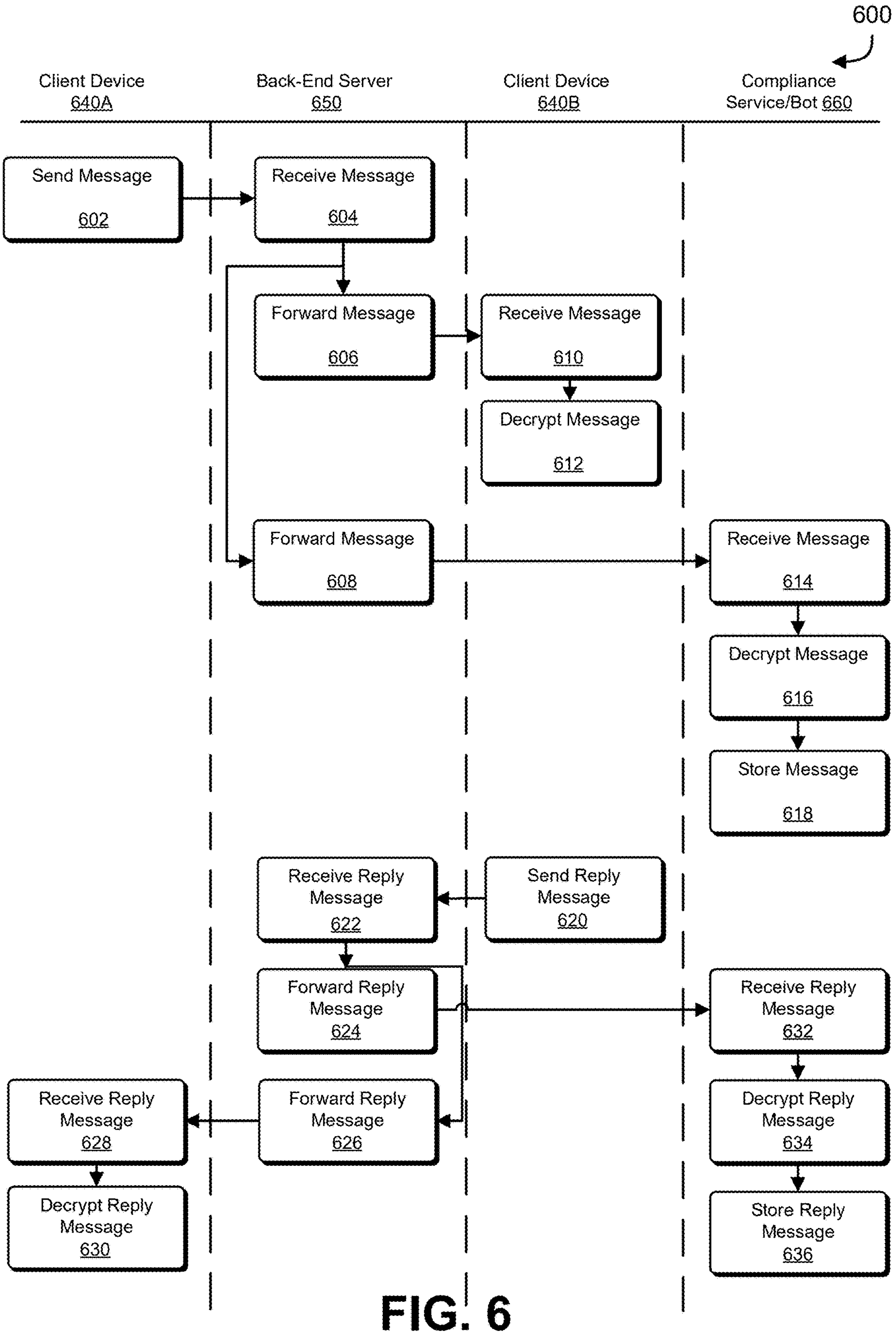
FIG. 6 is a swim diagram that illustrates an example of messaging between client devices of computing resource service provider in accordance with a compliance service in accordance with an embodiment.

FIG. 6 is a swim diagram illustrating an example of a process 600 for messaging between client devices of a computing resource service provider in accordance with a compliance service in accordance with various embodiments. Some or all of the process 600 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). The process 600 includes a series of operations illustrating messaging between client devices 630A-630B of a computing resource service provider in accordance with a compliance service/bot 660. The client devices 630A-630B may be similar to the client devices 110A-110B of FIG. 1. The compliance bot 660 may be similar to the compliance bot 108 of FIG. 1. The back-end server 650 is similar to the back-end server 106 of FIG. 1.

In 602, client device 640A transmits a message (e.g., TCP/IP packet) by connecting to a router and/or switchboard (not illustrated in FIG. 6) that routes the message the back-end server 650.

In 604, the back-end server 650 receives the message and identifies information of a destination client device.

In 606, the back-end server 650 forwards or routes the message to a destination client device, such as client device 630B. In addition, in 608, the back-end server 650 forwards the message to compliance bot 660.

In 610, the client device 640B receives the message and proceeds to decrypt the message 612. The client device 640B may decrypt the message using a private key of a key pair.

In 614, the compliance bot 660 receives the message and proceeds to decrypt the message 616 using a similar decryption method as the client device 640B.

In 618, the compliance bot 660 stores the message in a data storage resource, such as data storage 590 in FIG. 5., based on a configuration or configuration file of the compliance bot, provided by the administrator console 104 of FIG. 1 to the user 102 of FIG. 1. In one embodiment, the data storage resource is an archival data storage. The archival data storage may persistently store data that may be infrequently accessed. In one embodiment, the compliance bot 660 may interact with the archival data storage to generate one or more archives. Each archive may represent one or more data files that may be combined to form the archive.

In 620-636, client device 640B transmits a reply message to client device 640A following similar operations described above in 602-618. For example, in 624 and 626, the back-end sever 650 routes the reply message to the client device 640A and the compliance bot 660. As indicated in the process 600, the compliance bot 660 "listens" to both the message and the reply message transmitted between client devices 640A-640B in accordance with a compliance service being activated in the organizational network of the client devices.

Figure 7:
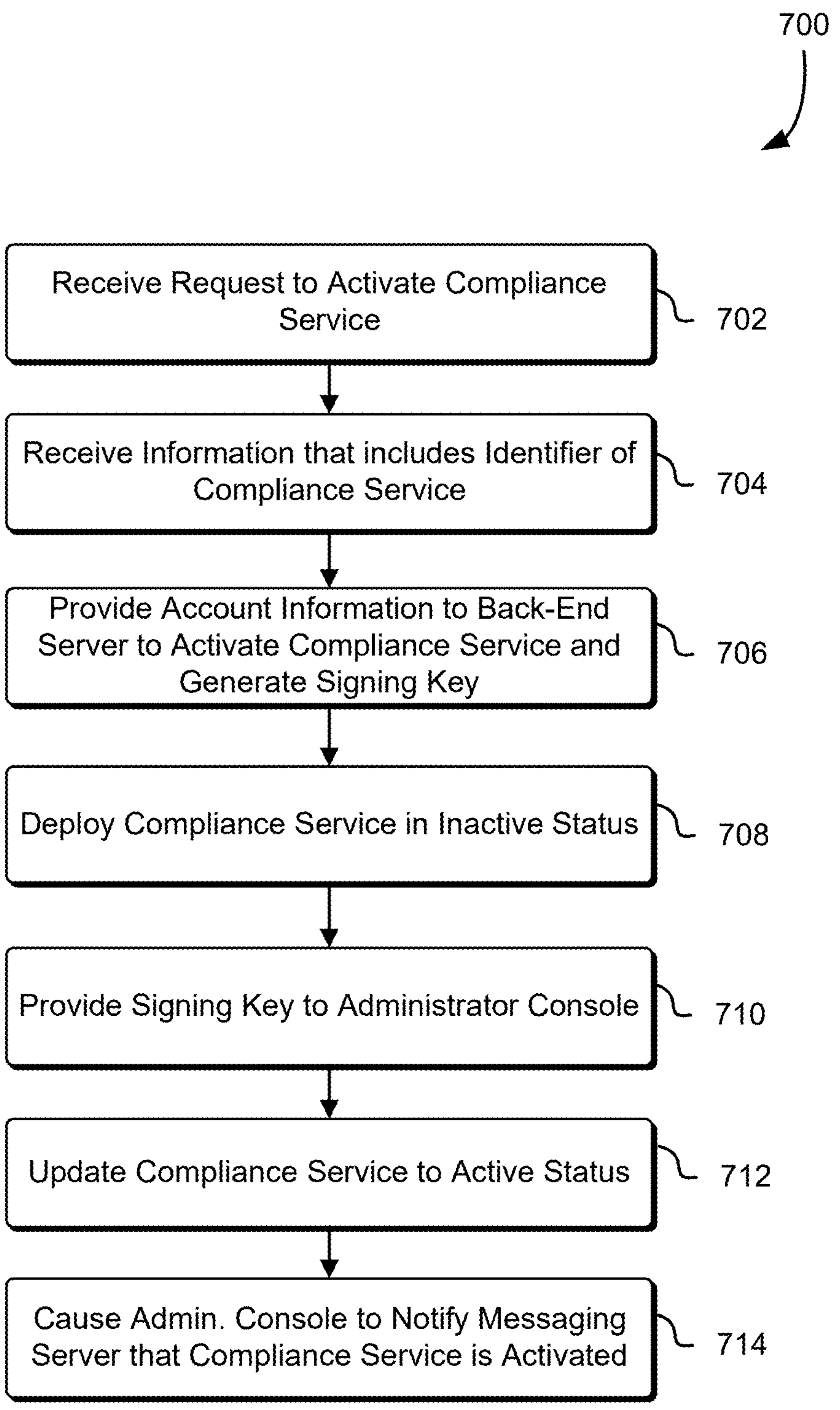
FIG. 7 is a flowchart that illustrates an example of activating a compliance service in accordance with an embodiment.

FIG. 7 is a flowchart illustrating an example of a process 700 for activating a compliance service in accordance with various embodiments. Some or all of the process 700 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media).

Figure 9:
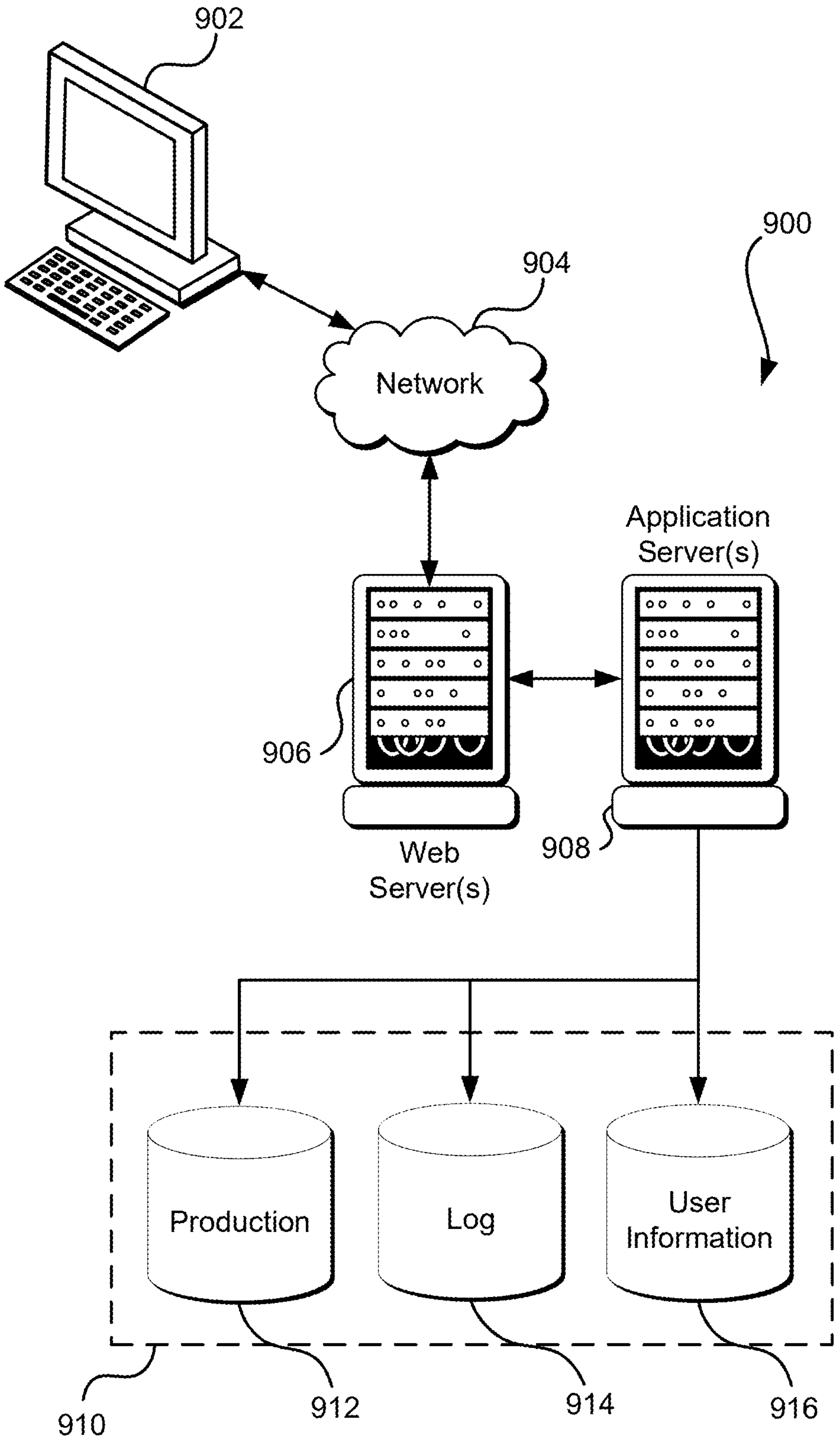
FIG. 9 illustrates a system in which various embodiments can be implemented.

For example, some or all of process 700 may be performed by any suitable system, such as the computing device 900 of FIG. 9. The process 700 includes a series of operations wherein a request is received to activate a compliance service, account information associated with a compliance service is provided, and an indication of a successful start of the compliance service. It is contemplated that the process 700 may be performed by a compliance service, such as the compliance service 108 of FIG. 1.

In 702, the system performing the process 700 may receive a request from a client device of a user to activate a secure communications session that complies with a data retention policy (e.g., how records and data should be formatted, how long the data is kept, what storage system should be used, etc.), the request including proof of credentials usable to authenticate the user (e.g., username, password, multifactor authentication, etc.).

In 704, in response to generating an interface (e.g., graphical user interface) with a prompt to enter the proof of credentials, the system receives from the client device of the user information that includes an identifier that corresponds to a software application (e.g., compliance bot username) representing a participant in the secure communication session and starts a compliance service docker image. The information includes a challenge value (e.g., initial password) that was created on the administrator console 104 of FIG. 1. The challenge may be submitted to the system as a password environment variable or password value in a secret. When setting up the compliance bot the first time a new password will be generated, which will become the password for the compliance bot. The identifier (e.g., bot username) may be displayed by an administrator console for a user to copy and used to start the compliance bot. The identifier may also be used by the administrator console to create a secret, of credentials associated with compliance bot, in a secrets manager of a service provider.

In 706, the compliance docker image provides, to a back-end server of a computing resource service provider, account information usable to activate a compliance account associated with the credentials and generate a user signing key. The compliance docker image interacts with the back-end server to provision the account associated with the compliance bot and start the messaging component of the server system. The compliance docker image further interacts with the back-end server to generate a user signing key to be provided to the client device of user 102 in FIG. 1. In 708, in response to providing the account information, the compliance docker image deploys the compliance bot 108 of FIG. 1. The compliance bot status is initially set to an inactive status.

In 710, the compliance service interacts with the back-end server to provide the user signing key to an administrator console of the computing resource service provider. When the administrator console receives the user signing key, it may proceed to fully activate the compliance service and, in 712, update the compliance bot to active status.

In 714, the system causes the administrator console to communicate with the back-end server to indicate compliance being activated. The administrator console may proceed to notify a messaging component server of the back-end server that the compliance service is activated and the network is, now, being monitored by the compliance bot.

Note that one or more of the operations performed in 702-20 may be performed in various orders and combinations, including in parallel.

Figure 8:
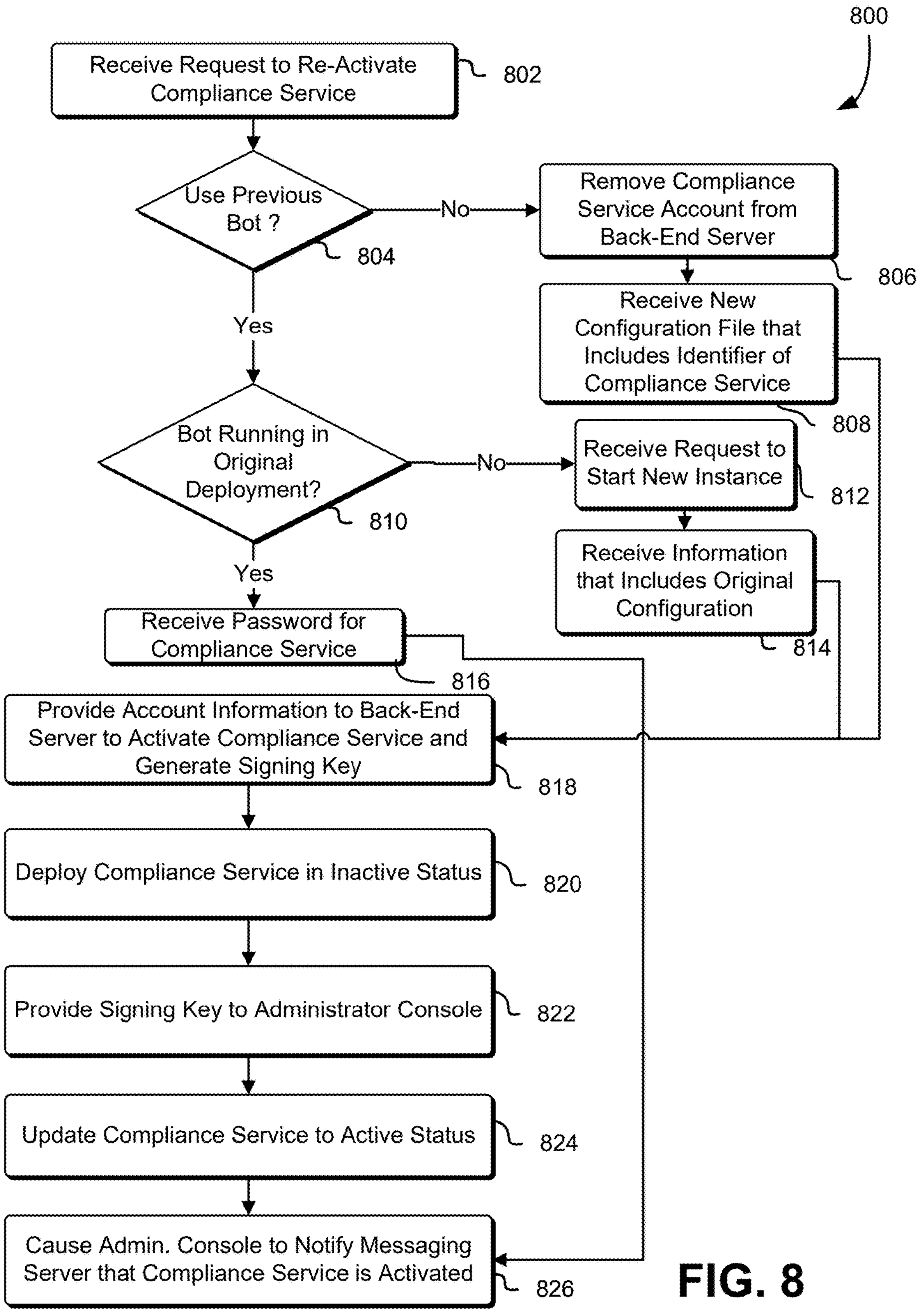
FIG. 8 is a flowchart that illustrates an example of re-activating a compliance service in accordance with an embodiment.

FIG. 8 is a flowchart illustrating an example of a process 800 for re-activating a compliance service in accordance with various embodiments. Some or all of the process 800 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 800 may be performed by any suitable system, such as the computing device 900 of FIG. 9. The process 800 includes a series of operations wherein a request is received to activate a compliance service, account information associated with a compliance service is provided, and an indication of a successful start of the compliance service. It is contemplated that the process 800 may be performed by a compliance service, such as the compliance service 108 of FIG. 1.

In 802, the system may receive a request to reactivate a compliance service for a network. In 804, if the previous compliance bot can be used, then the system performing the process 800 may proceed to 810, whereupon, if the customer leaves the compliance container running in the original deployment, then the system performing the process 800 may proceed to 816, whereupon the compliance service is reactivated by the entering the password for the compliance service.

Otherwise, if the previous compliance bot cannot be used, then the system performing the process 800 may proceed to 806, whereupon the compliance account is removed from back-end server (e.g., deleted, terminated, etc.) and a new compliance account can be generated to have the same account name and compliance bot name; however, the new compliance account will get a new user signing key. In 808, the system receives a new configuration file from the administrator console 104 of FIG. 1 that includes an identifier of the compliance service that may be used by a client device of a user to start the compliance service.

In 812, a compliance service can be reactivated by starting a new instance of the compliance account. The process of 800 may proceed to 818, whereupon, similar to 706 of FIG. 7, a compliance docker image provides to a back-end server account information usable to activate a new compliance account associated with the credentials and generate a new user signing key. In 820-826, the process may continue to deploy the compliance service in inactive status, provide the administrator console with the new user signing key, update the compliance service to active status, and cause the administrator console to indicate that the compliance service is activated.

In 810, it the compliance bot is not running in the original deployment, then the system performing the process 800 may proceed to 812, whereupon the system may receive a request to start a new instance of the compliance container. In this case, in 814, the system may receive for the user the original configuration file provided by the administrator console 104 of FIG. 1 to start the compliance container. The process of 800 may then proceed to 820-826, where the process may continue to deploy the compliance service, provide the administrator with the new user signing key, update the compliance service to active status, and cause the administrator console to indicate that the compliance service is activated.

Note that one or more of the operations performed in 802-826 may be performed in various orders and combinations, including in parallel.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PUP: Hypertext Preprocessor ("PUP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java©, C, C# or C++, or any scripting language, such as Ruby, PUP, Perl, Python or TCL, as well as combinations thereof. In an embodiment, the one or more servers also include database servers, including without limitation those commercially available from Oracle*, Microsoft*, Sybase*, and IBM© as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means “based at least in part on” and is not limited to “based solely on.”

Conjunctive language, such as phrases of the form “at least one of A, B, and C,” or “at least one of A, B and C,” (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases “at least one of A, B, and C” and “at least one of A, B and C” refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple “A”). Thus, such conjunctive language is not generally intended to imply that certain embodiments require at least one of A, at least one of B and at least one of C each to be present. Similarly, phrases such as “at least one of A, B, or C” and “at least one of A, B or C” refer to the same as “at least one of A, B, and C” and “at least one of A, B and C” refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term “plurality” indicates a state of being plural (e.g., “a plurality of items” indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., “such as”) provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

Note that, in the context of describing disclosed embodiments, unless otherwise specified, use of expressions regarding executable instructions (also referred to as code, applications, agents, etc.) performing operations that “instructions” do not ordinarily perform unaided (e.g., transmission of data, calculations, etc.) denotes that the instructions are being executed by a machine, thereby causing the machine to perform the specified operations.

What is claimed is:

1. A computer-implemented method, comprising:

receiving, from a client device of a user, a request to activate a secure end-to-end communications session that complies with a data retention policy, the request including proof of credentials usable to authenticate the user;

receiving, from the client device of the user, information that identifies a compliance software application, wherein the compliance software application comprises an automated observer in the secure end-to-end communication session;

in response to providing, to a back-end server of a computing resource service provider, account information usable to activate a compliance account associated with the credentials, obtaining a user signing key, the user signing key usable by the client device to digitally sign messages sent by the user over the secure end-to-end communications session;

deploying the compliance software application to cause the compliance software application to:

monitor the secure end-to-end communications session and collect data relating to the secure end-to-end communications session to verify compliance with the data retention policy; and causing, as a result of providing the user signing key to an administrator console of the computing resource service provider, the administrator console to communicate with the back-end server to indicate compliance is being activated, indication of compliance being activated comprising a notification that the secure end-to-end communications session is being monitored in compliance with the data retention policy by the compliance software application.

2. The computer-implemented method of claim 1, wherein the information comprises a challenge value that is usable, at least in part, to authenticate the user.

3. The computer-implemented method of claim 2, wherein the compliance account is activated as a result of authenticating the user based at least in part on the challenge value.

4. The computer-implemented method of claim 1, further comprising causing an interface to prompt the user to create a secret based at least in part on the information, the secret being stored in a storage system of a local user environment.

5. The computer-implemented method of claim 1, wherein the secure end-to-end communication session is to be monitored by the compliance software application.

6. A system, comprising:

one or more processors; and memory that stores computer-executable instructions that, if executed, cause the one or more processors to:

receive a request to activate a secure communications session that complies with a data policy;

receive configuration information that corresponds to a compliance software application, wherein the compliance software application comprises an automated observer in the secure communications session;

obtain, in response to providing, to a server of a computing resource service provider, account information usable to activate a compliance account associated with credentials, a user signing key, the user signing key usable to digitally sign messages sent over the secure communications session;

launch the compliance software application to cause the compliance software application to collect data relating to the secure communications session to verify compliance with the data policy; and cause, as a result of providing the user signing key to an administrator console of the computing resource service provider, the administrator console to communicate with the server to indicate that the compliance account has been activated.

7. The system of claim 6, wherein the user signing key is a public key of an asymmetrical key pair.

8. The system of claim 6, wherein the configuration information comprises a challenge value and an identifier of the compliance software application.

9. The system of claim 6, wherein the computer-executable instructions that cause system to cause the administrator console to communicate with the server includes instructions that cause the system to cause the administrator console to notify one or more client devices that the secure communications session is being monitored in accordance with the data policy.

10. The system of claim 6, wherein the computer-executable instructions further include instructions that cause the system to cause the server to provide configuration information to a plurality of client users, the configuration information including an identifier of the compliance software application and security protocols usable to authenticate a client user of the plurality of client users, the identifier of the compliance software application usable to activate the compliance account.

11. The system of claim 6, wherein the computer-executable instructions further include instructions that further cause the system to, as a result of the compliance account being activated, prevent a subsequent message in the secure communications session from being sent unless the compliance software application is included as a recipient of the subsequent message.

12. The system of claim 6, wherein:

the computer-executable instructions further include instructions that cause the system to cause a client device of a user to store a secret using the computer resource service provider; and the secret comprises configuration information that includes a challenge value.

13. The system of claim 6, wherein the computer-executable instructions further include instructions that cause the system to:

encrypt a data item transmitted via the secure communications session creating an encrypted data item, using a key obtained from a key management system; and store the encrypted data item in a storage system of the computing resource service provider.

14. A non-transitory computer-readable storage medium storing thereon executable instructions that, as a result of being executed by one or more processors of a computer system, cause the computer system to at least:

receive, from a device, a request to activate a secure communications session that complies with a policy, the request including proof of credentials usable to authenticate a user;

receive, from the device, information that identifies a compliance software application, wherein the compliance software application comprises an automated observer in the secure communications session;

obtain, in response to providing, to a server of a computing resource service provider, account information usable to activate a compliance account associated with the credentials, a cryptographic key, the cryptographic key usable by the device to digitally sign messages sent over the secure communications session;

deploy and activate the compliance software application to cause the compliance software application to monitor the secure communications session to verify compliance with the policy; and cause, as a result of providing the cryptographic key to an administrator console of the computing resource service provider, the administrator console to communicate with the server to indicate the compliance account has been activated in accordance with the policy.

15. The non-transitory computer-readable storage medium of claim 14, wherein:

the executable instructions further comprise instructions that cause the computer system to cause a client device of the user to store a secret using a secrets management service; and the secret comprises a challenge value corresponding to the compliance software application.

16. The non-transitory computer-readable storage medium of claim 14, wherein the executable instructions further comprise instructions that cause the computer system to provide a notification to a messaging server of the computing resource service provider that messages in the secure communications session are being monitored by the compliance software application.

17. The non-transitory computer-readable storage medium of claim 14, wherein the executable instructions further comprise instructions that cause the computer system to, in an event where the compliance account has been deactivated:

obtain a request to reactivate the compliance account; and reactivate the compliance account at least in part by instantiating a new instance of the compliance account.

18. The non-transitory computer-readable storage medium of claim 14, wherein the executable instructions further comprise instructions that cause the computer system to:

generate, as a result of the compliance account having been deactivated, a new compliance account;

remove the compliance account from the server; and receive new information comprising a configuration file that includes an identifier that corresponds to the compliance software application.

19. The non-transitory computer-readable storage medium of claim 14, wherein the executable instructions further include instructions that further cause the computer system to:

generate, as a result of the compliance account having been deactivated, a new compliance account; and provide, to the server of the computing resource service provider, account information usable to activate the new compliance account and generate a new user signing key.

20. The non-transitory computer-readable storage medium of claim 14, wherein the information includes a configuration file from the administrator console, the configuration file comprising the credentials and an application programming interface (API) key that is usable for providing status of the compliance account to the administrator console.

21. The non-transitory computer-readable storage medium of claim 14, wherein the information comprises instructions for storing a data item transmitted via the secure communications session.

* * * * *